July 25, 1972 M. AUST ET AL 3,679,520
APPARATUS FOR FEEDING FABRIC AND RUBBER INSERTS
TO A TIRE BUILDING DRUM
Filed Nov. 12, 1969 8 Sheets-Sheet 1

Inventors:
Manfred Aust
Gerhard Smuda

Inventors.
Manfred Aust
Gerhard Smuda

July 25, 1972  M. AUST ET AL  3,679,520
APPARATUS FOR FEEDING FABRIC AND RUBBER INSERTS
TO A TIRE BUILDING DRUM
Filed Nov. 12, 1969  8 Sheets-Sheet 3
FIG. 3
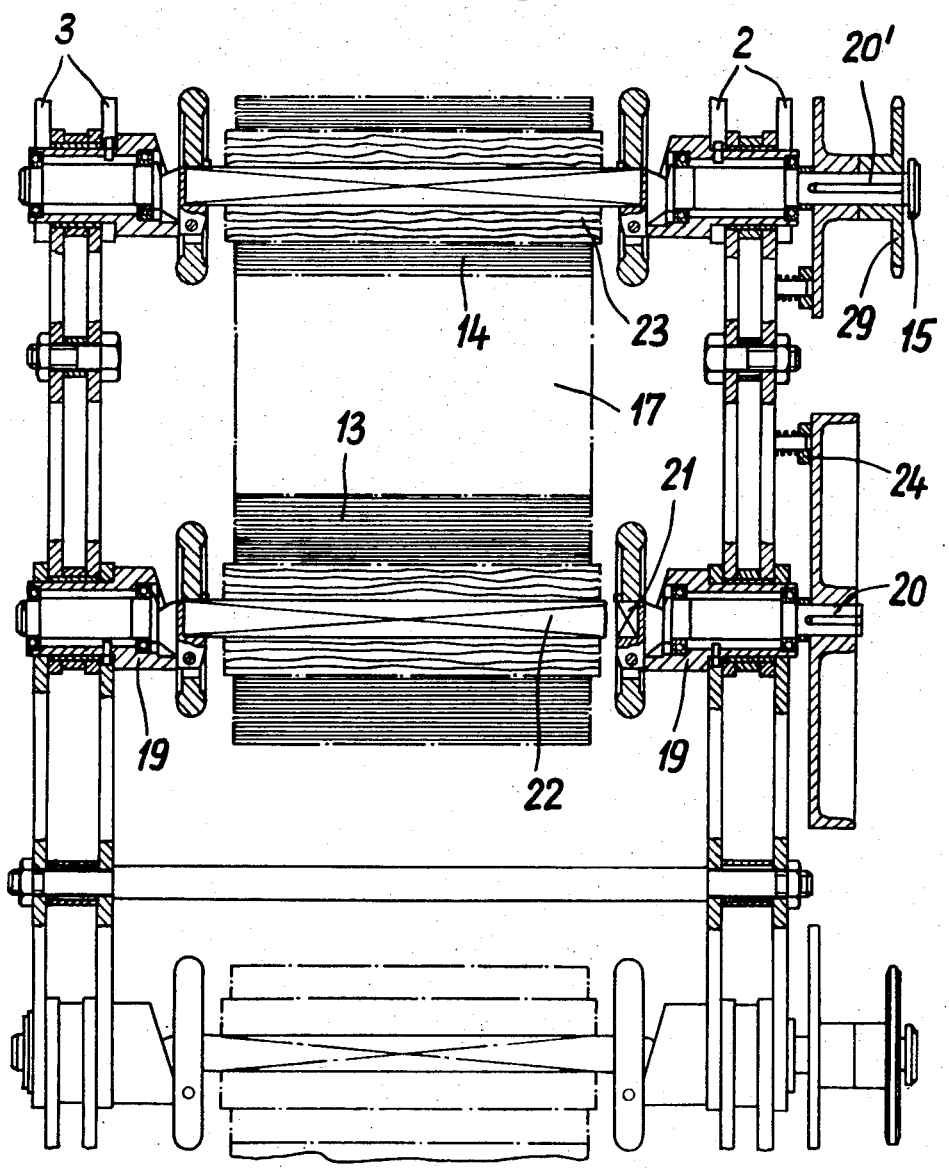
Inventors:
Manfred Aust
Gerhard Smuda
By

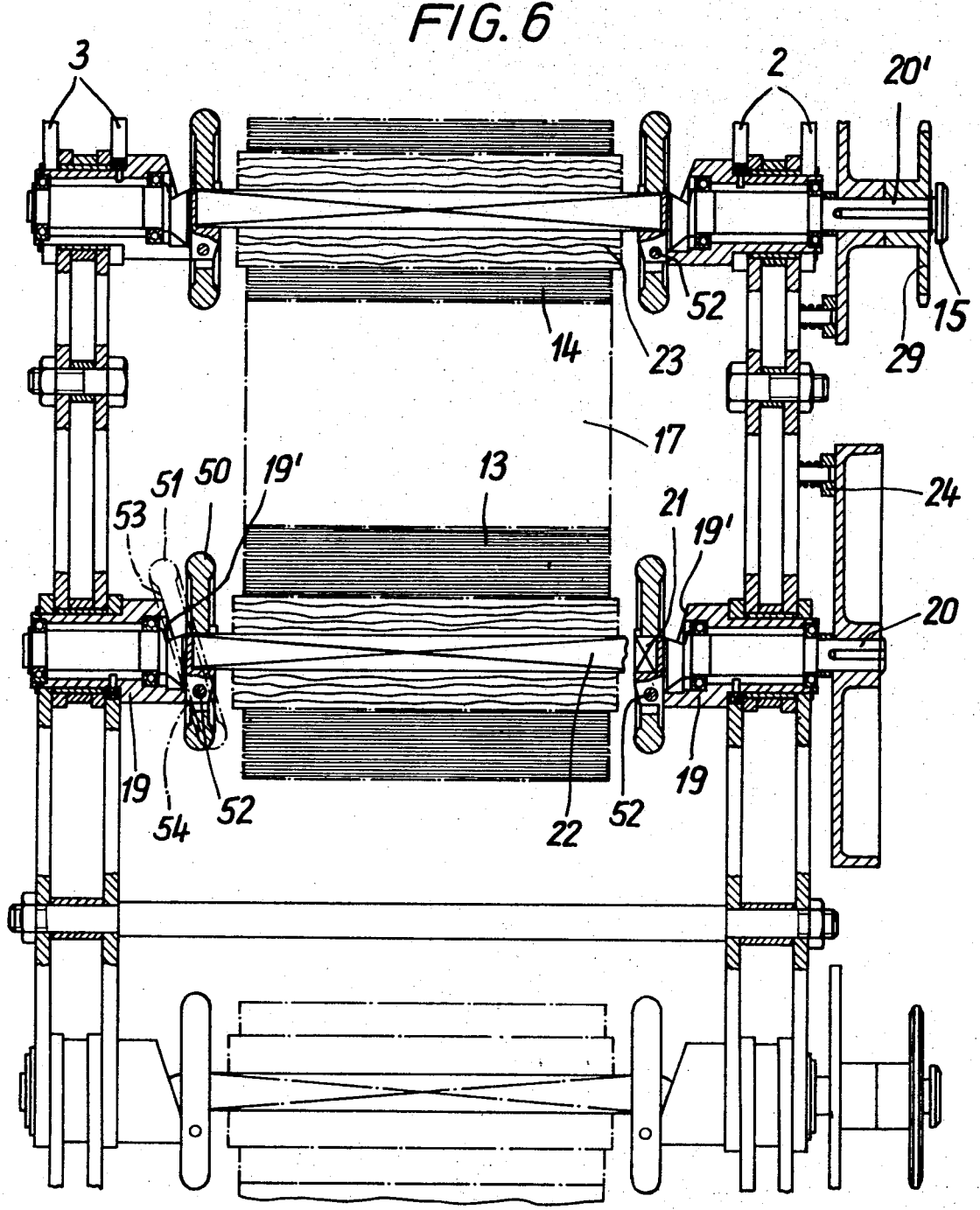

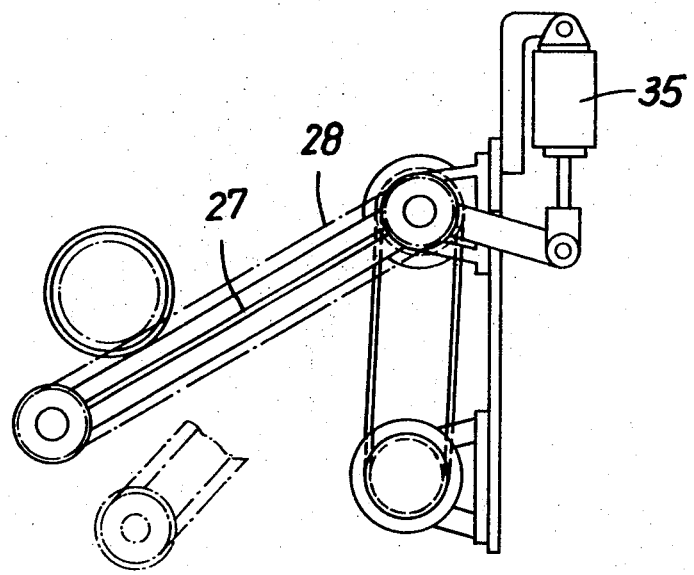
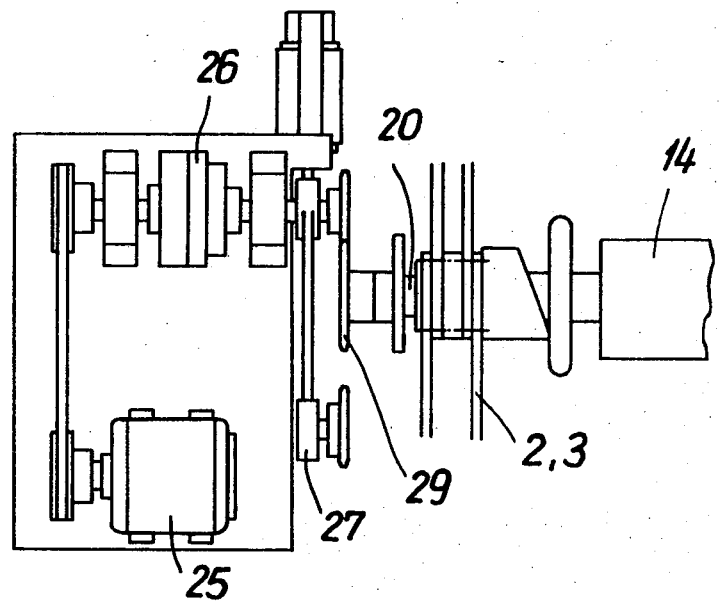

July 25, 1972  M. AUST ET AL  3,679,520
APPARATUS FOR FEEDING FABRIC AND RUBBER INSERTS
TO A TIRE BUILDING DRUM
Filed Nov. 12, 1969  8 Sheets-Sheet 7

Inventors:
Manfred Aust
Gerhard Smuda
By
Walter Becker

Inventors:
Manfred Aust
Gerhard Smuda

United States Patent Office 3,679,520
Patented July 25, 1972

3,679,520
APPARATUS FOR FEEDING FABRIC AND RUBBER INSERTS TO A TIRE BUILDING DRUM
Manfred Aust and Gerhard Smuda, Hamburg, Germany, assignors to Fried. Krupp Gesellschaft mit beschrankter Haftung, Essen, Germany
Filed Nov. 12, 1969, Ser. No. 875,798
Claims priority, application Germany, Nov. 15, 1968, P 18 09 137.7
Int. Cl. B29h 17/20
U.S. Cl. 156—406
6 Claims

ABSTRACT OF THE DISCLOSURE

An apparatus for feeding fabric and rubber layers for a tire to a tire building drum of a tire building machine with a plurality of groups of rolls advanced toward the tire building drum by two substantially parallel link chains each of which comprises bearing means into which the said groups of rolls are easily exchangeably inserted, each of said groups including a layer roll and a roll for winding up the intermediate web which prior to the winding off of a layer section from said layer roll separates successive windings of said layer roll from each other.

---

The present invention relates to a charging stand and, more specifically, to an apparatus for feeding different fabric and rubber inserts for a tire to the tire building drum of a tire building machine with a plurality of pairs of rolls which, by means of a transporting device, are movable successively in front of a rolling-off device comprising a layer roll and an intermediate linen roll.

With heretofore known charging stands of the type involved, fixedly installed pairs of rolls are provided for receiving the bias-cut, rubberized cord fabric in two endless chain works or conveyors. The intermediate linen web has one of its ends fixedly connected to the intermediate linen roll, whereas its other end is fixedly connected to the layer roll so that the intermediate linen web is wound back and forth between the said two rolls. For purposes of loading the layer rolls, the rubberized cord fabric leaving the bias-cutting machine has there to be wound together with another intermediate linen or fabric web so as to form a bale. The bale is transported to the charging tower and there is wound upon the layer roll. With each winding on and off, there exists the danger that in view of the non-permissibly high pull on the cord fabric wear, the angle of the cord threads is changed whereby the quality of the tire to be produced is affected.

It is, therefore, an object of the present invention to provide an arrangement which will overcome the above mentioned drawback.

This object and other objects and advantages of the invention will appear more clearly from the following specification in connection with the accompanying drawings, in which:

FIG. 3 represents a section through a pair of rolls of a charging stand according to the invention.

FIG. 6 illustrates self-locking bearings used in connection with the present invention and their operation.

FIG. 7 diagrammatically illustrates the drive for the chain rocker in the winding-off device of the present invention.

Figure 8:
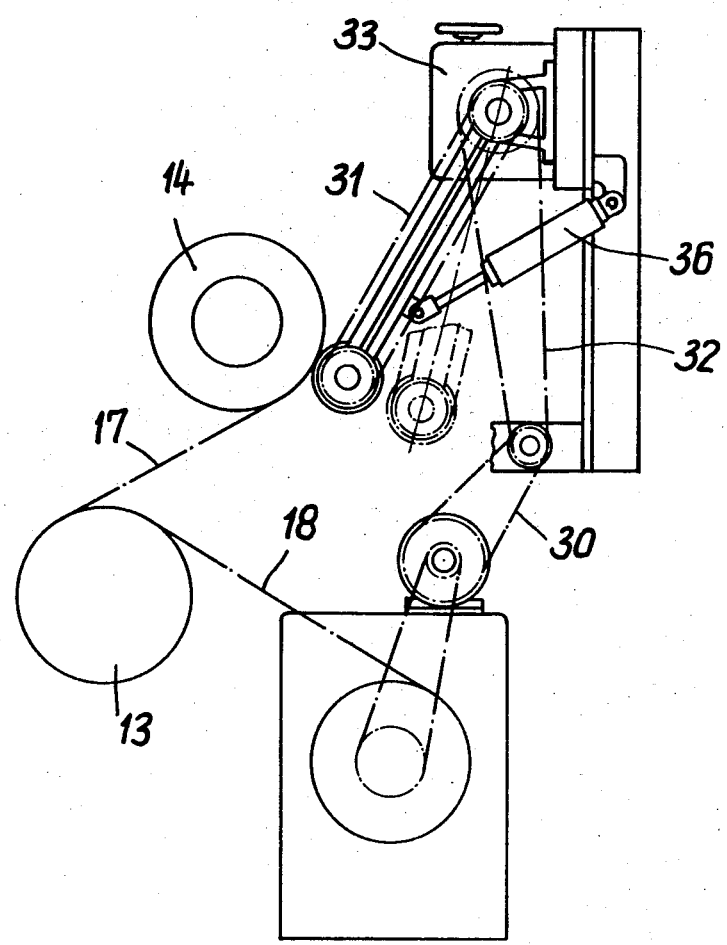
Figure 9:
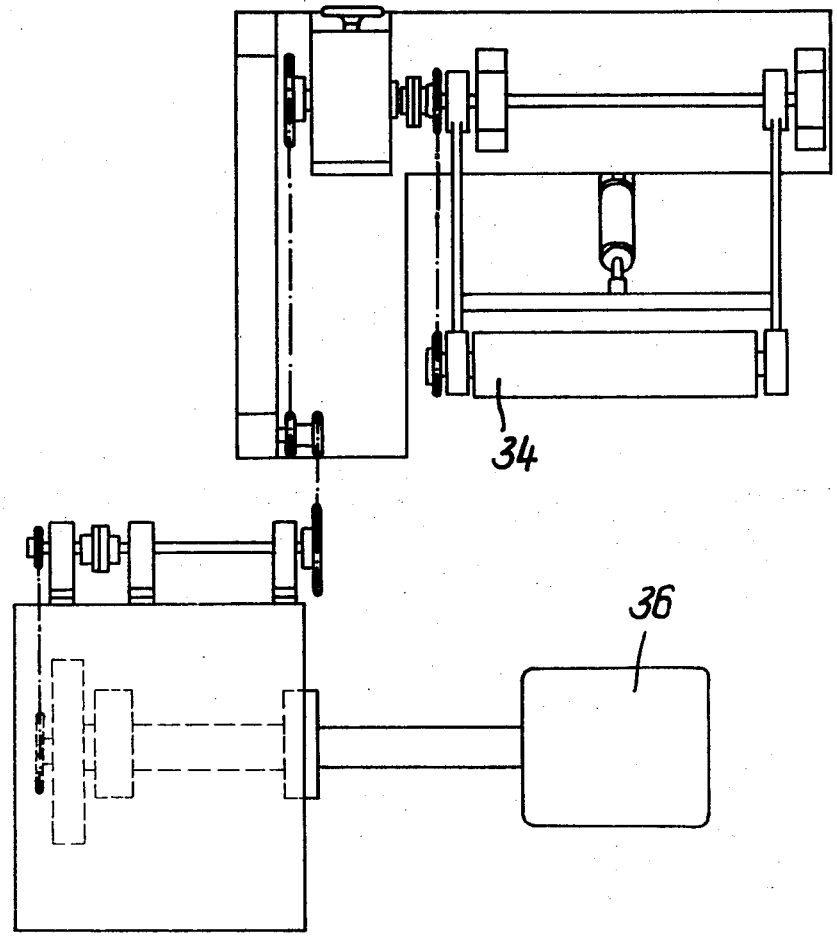

FIGS. 8 and 9 respectively illustrate in side and front view the drive for the braking roller of the winding-off device.

The apparatus according to the invention for feeding different fabric and rubber layers for a tire to the tire building drum of a tire building machine provided with a plurality of pairs of rolls, which are movable by means of a transporting device in front of a rolling-off device, is characterized primarily in that for the transporting device there are provided two endless side bar chains which are parallel to each other and change their direction in view of reversing sprocket wheels over which the chains pass while the layer rolls and the intermediate linen or fabric rolls are easily exchangeably inserted in roll bearings provided in the chain joints. In this way, there exists the possibility of inserting the fabric bales directly into the charging stand, which bales have been wound up on the fabric cutting machine, so that the rewinding will be avoided. This brings about a great simplification in operation, a saving in time and an improvement in the quality of the tires. Moreover, depending on the number of the links of the side bar chain, tires with particularly any high number of layers can be built up without requiring a change in the charging tower.

Furthermore, it is suggested according to the present invention that the layer and intermediate fabric rolls are supported by axles non-rotatably connected thereto and easily removable while the roll bearings are equipped with bearing pivots into which through the intervention of recesses axles are non-rotatably inserted which in a manner known per se during the rotation of the axles close automatically. This brings about a considerable acceleration in the cycle of operation when loading the charging stand.

According to a further development of the present invention, the side bar chains may be driven by a brake motor which controls the same by means of cams arranged on the drum bearings and also automatically stops the same after the next following pair of rolls has reached the withdrawing position ahead of the rolling-off device.

In order further to automate the operation, and to avoid any disturbance or disorders as far as possible, it is suggested according to a further development of the present invention to provide a rolling-off device, which may be of any standard design, for the withdrawal of a layer section from a layer roll. When the respective layer roll and the respective intermediate fabric roll occupy their withdrawing position, a driving chain driven through a slip clutch and moving in a pneumatically pivotable chain swing or rocker, drives the intermediate fabric roll which winds up the intermediate fabric. A braking roll, which is pneumatically pressed against the intermediate fabric roll, brakes the intermediate fabric roll to a speed which corresponds to the charging or loading of the wound-off layer section onto the tire building drum. In this connection, it is advantageous to provide an automatic brake for the braking of the layer roll following the withdrawal of a layer section. Furthermore, it is advantageous for the rewinding of the adjacent layer end which is wound off during the withdrawal of a layer section but is no longer separated, to provide a rewinding motor which, by means of a photoelectric cell controlled by the free hanging bearing ends, controls the respective layer roll in the position which follows the withdrawal position and turns the same back by means of a friction roller.

Figure 1:
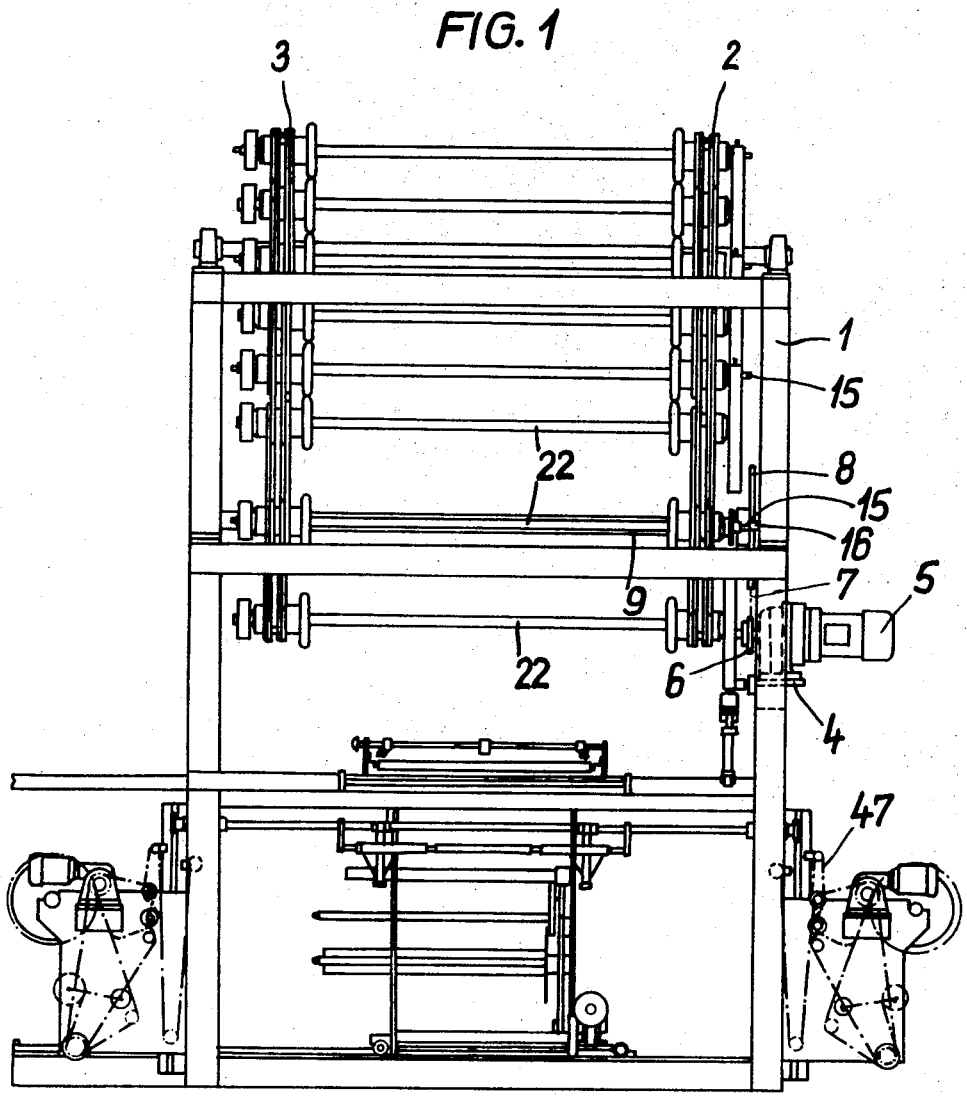
FIG. 1 is an end view of a charging stand according to the invention.
Figure 2:
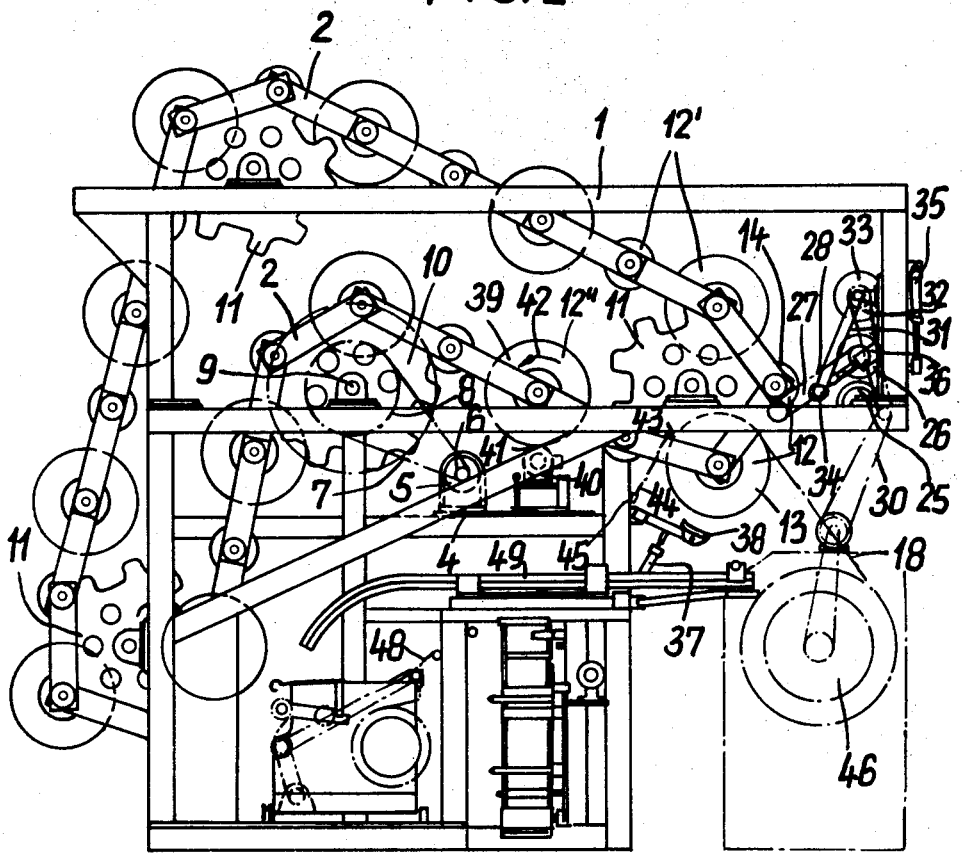
FIG. 2 is a side view of the charging stand according to FIG. 1.
Figure 4:
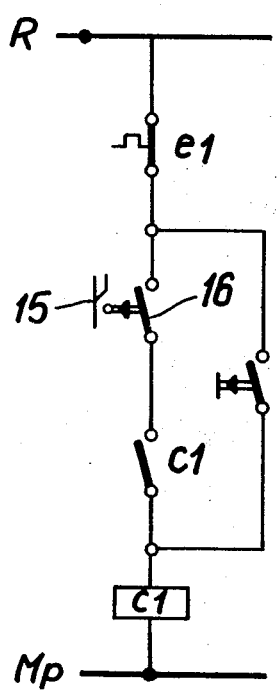
FIGS. 4 and 5 illustrate the circuit diagram for the brake motor of the feeding apparatus according to the present invention.
Figure 5:
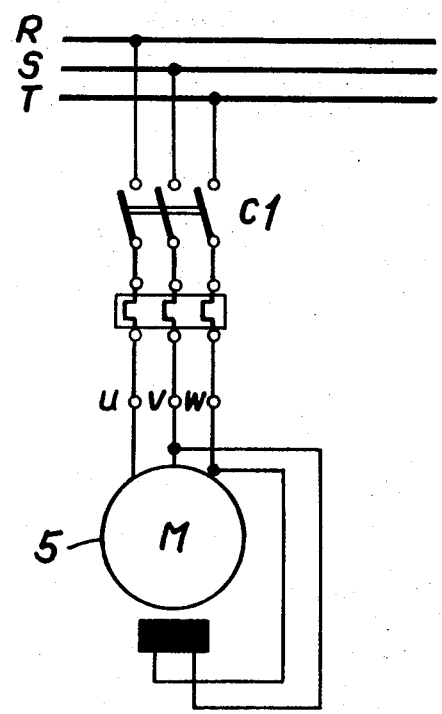

Referring now to the drawings in detail, the charging stand comprises a framework 1 which serves for receiving the side bar chains 2 and 3. The said chains are driven by a brake motor 5 through a pinion 6, a roller chain 7 and a sprocket wheel 8, said motor 5 being mounted on a support 4. The said sprocket wheel 8 is keyed to a shaft 9 to which also the two driving wheels 10 are keyed. The chains 2 and 3 are passed over link chain wheel sprockets 11. The working position of the pairs of rolls 12, 12', 12"—each pair comprising a layer roll 13 and an intermediate fabric roll 14—is determined by cams 15 which are mounted on the bearing pivot 20' of the intermediate fabric roller 14. These cams 15 (see FIG. 4) actuate an electric switch 16 which is adapted to turn off the brake motor 5. The turning on of the brake motor 5 is effected by means of a push button (not illustrated).

For receiving the cord fabric 18 which is wrapped in intermediate linen or fabric 17 and forms bales 13, there are in the joints of the chains 2 and 3 provided automatically closing bearings 19 the bearing pivot 20 of which is provided with recesses 21 for receiving shafts 22 carrying the layer roll 13. When it is intended to insert a shaft 22 with a layer roll 13 into pertaining roll bearings 19, the locking disc 50 is pivoted about pivot 52 into position 51 shown in dot-dash lines in FIG. 6 in which position disc 50 engages the slanted or bevelled front edge 19' of bearing 19. As will be seen from FIG. 6, pivot 52 is arranged in the bearing studs 20 and 20' respectively. In view of this pivoting movement, recess 21 is freed. When after insertion of a shaft 22 carrying a bale 13 the latter is turned, the surface 53 of locking disc 50 slides along the slanted surface 19' of the stationary bearing 19. After a rotation of 180° the surface 53 has reached point 54 at which point disc 50 has reached its locking position. The intermediate linen rolls 14 are journalled in a corresponding manner. The cord fabric 18 which, in a fabric cutting machine is inserted into intermediate linen or fabric 17 and is wound up to form a bale 13, is slipped onto a shaft 22 which is placed onto the back side of the charging tower into recesses 21 of the bearing pivots 20. The end of the intermediate linen 17 is wound around the cord 23 of the roll 14. Intermediate linen or fabric is withdrawn from the layer roll 13 whereby the latter is started to rotate and the automatic closing of the bearing 19 is effected. Continuously effective brakes 24 prevent an unintentional or accidental turning of the rolls. Similarly, also the remaining layer storage devices are equipped with layer rolls.

On that front side of the charging stand which faces the tire building machine, for winding out the cord fabric there is provided a known electronically driven rolling-off device. A motor 25 (FIG. 6) through a slip clutch 26, which is designed as variable induction clutch, drives a chain drive 27. The driving chain 28 of chain drive 27 meshes with a sprocket wheel 29 (FIG. 3) which is connected to a bearing pivot 20' of the intermediate linen roll 14 so as to drive the same. The energization of the induction clutch 26 is so adjusted that the intermediate fabric or linen during the winding-out operation is rightly wound onto the core 23 of the roller 14. A rubberized braking roller 24 (FIG. 3), which is driven by chain drives 30, 31 and 32 and an infinitely variable control drive 33, acts upon the outer circumference of the roll 14 and winds the cord fabric 18 off the bale 13 in view of the pull exerted upon the intermediate linen or fabric 17. This winding of the cord fabric 18 from the bale 13 is effected at a speed in conformity with the circumferential speed of the tire building drum 46. The winding of the pull sensitive rubberized cord fabric 18 off the bale 13 is thus effected by winding the pull nonsensitive intermediate linen 17 onto the core 23. In order to assure that the intermediate linen 17 is smoothly wound upon the core 23, it is necessary that the drive for the chain rocker 27 (see FIG. 7) runs ahead with regard to the speed set for the braking roller 24 (FIG. 3) which last mentioned speed is set in conformity with the circumferential speed of the tire building drum. This running ahead of the drive for chain rocker 27 is compensated for by a slip in the induction clutch.

When the roll pairs 12 are advanced, the chain rockers 27 and the braking roll 34 are, by means of pneumatically actuated air cylinders 35 and 36, lifted off the roll 14 and, when reaching the withdrawing position of the succeeding roll pairs 12', are again automatically moved adjacent thereto. After withdrawal of a layer section and feeding the same to the tire building drum 46, the roll 13 is, by means of a brake 38 actuated by an air cylinder 37, additionally braked for a short period. The air cylinder 37 is actuated through the intervention of a nonillustrated electromagnetic valve which receives its electric control impulses from a limit switch (not illustrated), built into the tire building machine, after each deposit step of fabric upon the tire building drum has been completed. At the same time, the said limit switch closes the energizing circuit for an adjustable time relay which limits the braking period of brake 38. As soon as the set time has expired, the electromagnetic valve is de-energized, and brake 38 returns to its starting position. The rewinding of the piece of cord fabric which hangs between the tire building drum 46 and the roll pair 12 is effected after further transporting the roll pair 12 to the next following position 12". A disc 39 connected to the layer roll 13 is then driven by the friction rollers 41 connected to the rewinding layer end of the cord fabric web 18 causes the light beam 44 emanated from an emitter lamp 43 to hit upon a photoresistor 45 whereby the rewinding motor 40 is turned off. The rewinding motor 40 receives its turning-on impulse from a contact of the control relay for the brake motor 5 as soon as motor 5 is turned off by cam 15 actuated limit switch 16 when the pair of rollers 12 has reached working position.

The servicer set forth above furthermore comprises running-off devices for the chafer 47 and breaker 48 as well as a tread strip pan 49 for the feeding of the tread strip.

It is, of course, to be understood that the present invention is, by no means, limited to the particular showing in the drawings but also comprises any modifications within the scope of the appended claims.

What we claim is:

1. An apparatus for feeding fabric layers and rubber layers to a tire building drum of a tire building machine, which includes: frame means, transporting means supported by said frame means and comprising two substantially parallel endless link chains, bearing means respectively supported by said chains so that the bearing means of one chain are in substantially axial alignment with the bearing means of the other chain, groups of roll means exchangeably inserted in said bearing means, each of said groups of roll means including two rolls for respectively receiving layers to be applied to a tire and intermediate web means to be placed intermediate the windings of rubber layers, each of said rolls of each of said groups of roll means including a shaft, and each of said bearing means including a recessed bearing stud adapted to receive an end of the respective shaft and to automatically close in response to a rotation of the respective shaft.

2. An apparatus according to claim 1, which includes brake motor means drivingly connected to said chains, cam means associated with said bearing means and operatively connected to and controlling said motor means so as to stop said chains in response to the respective roll group reaching its withdrawal stations adjacent the tire building drum.

3. An apparatus for feeding fabric layers and rubber layers to a tire building drum of a tire building machine, which includes: frame means, transporting means supported by said frame means and comprising two substantially parallel endless link chains, bearing means respectively supported by said chains so that the bearing means of one chain are in substantially axial alignment with the bearing means of the other chain, groups of roll means exchangeably inserted in said bearing means, each of said groups of roll means including two rolls for respectively receiving layers to be applied to a tire and intermediate web means to be placed intermediate the windings of rubber layers, unwinding means for turning said layer rolls when reaching their withdrawal stations in unwinding direction; said unwinding means including motor means, drive chain means drivingly connected to said motor means, and slip clutch means interposed between and drivingly connected to said motor means and said drive chain means; said drive chain means including chain rocker means and being drivingly connectable with the respective intermediate web receiving roll which in the withdrawal station of the respective layer roll receives the intermediate web for rotating said intermediate web roll; pneumatically operable means associated with said chain rocker means for pivoting the latter; and pneumatically operable brake roller means operable by said chain drive means for braking the respective web receiving roll to the speed corresponding to the unwinding speed of the respective pertaining layer roll.

4. An apparatus for feeding fabric layers and rubber layers to a tire building drum of a tire building machine, which includes: frame means, transporting means supported by said frame means and comprising two substantially parallel endless link chains, bearing means respectively supported by said chains so that the bearing means of one chain are in substantially axial alignment with the bearing means of the other chain, groups of roll means exchangeably inserted in said bearing means, each of said groups of roll means including two rolls for respectively receiving layers to be applied to a tire and intermediate web means to be placed intermediate the windings of rubber layers, brake means for braking a layer roll immediately following a withdrawal of a layer section therefrom and its application to the tire building drum.

5. An apparatus according to claim 3, which includes an electric cell, electric circuit means controlled by said electric cell, a return winding motor electrically connected to said circuit means, and means operatively connecting said motor means with the respective layer roll in its withdrawal station in response to unwinding from said last mentioned layer roll drum an excessive layer length and winding up said excessive layer length after the cutting off of the required layer length.

6. An apparatus according to claim 5, in which said means operatively connecting said motor means with the respective layer roll includes friction roller means.

References Cited

UNITED STATES PATENTS

| | | | |
|---|---|---|---|
| 1,491,282 | 4/1924 | Abbott et al. | 156—406 |
| 2,277,476 | 3/1942 | Bostwick | 156—406 |
| 3,019,153 | 1/1962 | Noall et al. | 156—406 |

STEPHEN C. BENTLEY, Primary Examiner

U.S. Cl. X.R.

242—64